Aug. 6, 1968   W. G. YOUNG ET AL   3,395,941
ROTARY AUGER MINING BARREL HEAD
Filed July 29, 1965   6 Sheets-Sheet 3

INVENTORS
WILLIAM G. YOUNG,
FREDERICK G. HORNING,
BY & WILLIAM D. CAROTHERS
CAROTHERS AND CAROTHERS
THEIR ATTORNEYS

Fig. 11 — Path of stepped bits when auger penetrates 12 ft. per min. & auger rotates at approx. 48 RPM Fig. 12 — Path of bits in same transverse plane when auger penetrates 9 ft. per min. & auger rotates at approx. 48 RPM Fig. 13 — Path of bits in same transverse plane when auger penetrates 12 ft. per min. & auger rotates at approx. 48 RPM United States Patent Office 3,395,941
Patented Aug. 6, 1968

3,395,941
ROTARY AUGER MINING BARREL HEAD
William G. Young and Frederick G. Horning, Salem, Ohio, and William D. Carothers, Carnegie, Pa., assignors to The Salem Tool Company, Salem, Ohio, a corporation of Ohio
Filed July 29, 1965, Ser. No. 475,688
15 Claims. (Cl. 299—90)

ABSTRACT OF THE DISCLOSURE

The rotary auger mining head disclosed herein is provided with an outer cylindrical barrel cutter mounted on an auger section having a forwardly open shank socket and a demountable inner cutter head with a passage therethrough and bits on their forward arcuate edges for cutting annular concentric kerfs and kerf cleaning fingers with a drive stem for axial insertion in the socket and the inner cutter secured to the end of the drive stem to be mounted concentrically with the rotary axis of the auger section and a collar on said drive stem between the cutter and the end of the socket. The inner coaxial cutter is provided with a wedge breaker on its outer arcuate surface to enter the kerf and break the coal against the inner surface of the barrel. The inner cutter being a semicylindrical drum within inner and outer arcuate walls ending in leading and trailing edges and having their forward arcuate edges progressively stepped forward from the leading to the trailing edges of the semicylindrical drum. The inner cutter may be provided with two semicylindrical drums.

This invention relates generally to a mining machine head having one or more rotatable and advancible cutter elements with bit holders and bits mounted on the forward end and positioned to cut the center and clearance on each side to form an annular kerf.

A principal object of this invention is the provision of an inner semicylindrical coaxially mounted mining machine breaker head on which there are steps on the forward edge to receive the bit holders with their bits to progressively extend the cutting edge of the bits on each step from the leading bit set until the last two bits on the last step. This arcuate breaker head may be less than semicircular or greater than semicircular in its arcuate extent, and it is preferable to have the last two bits of the set on the same step.

Another important object of this invention is the provision of a kerf cleaning finger projecting forwardly from the forward end of a rotatable and advanceable cutter element wherein the kerf cleaning finger is approximately as wide as the center kerf cutting bit but shorter than the same and positioned in line therewith to remove kerf cuttings and finds, known as "bug dust," without engaging the walls of the kerf. In a full cylindrical head these kerf cleaning fingers are advantageously positioned between selected bit holders and preferably between bit holders of adjacent bit sets which include bits disposed to cut the center and the clearance on each side to form the kerf. It is also advantageous to allow for a little more room than that ordinarily provided for a bit holder to permit the finger when passing through the kerf to draw the cuttings downwardly into the space below the bit holders and one each side of the arcuate member forming the head. When the arcuate member forming the head is less than a cylinder it is, of course, advantageous to place the cleaning finger in front of the leading bit which draws the cuttings down into the space forming the gap between the leading and trailing edge of the arcuate member. It is advantageous to have the cleaning finger wider than the bit because it rides in the center of the kerf but does not project as far as the bit and it is usually wider than the thickness of the arcuate member whether it be a drum or a semicircular cylinder. In such instance the finger is provided with an offset portion to engage the end of the cutter element and lie on one or even both sides thereof. This plate may extend considerably forward of the finger and a portion thereof may be cut downwardly to form a pocket to direct and insure the passage of the cuttings to the space behind the arcuate cutter element which is cut out to fit the pocket. The edge of the cut out pocket may be sloped to direct the kerf cuttings inwardly or outwardly of the cutter element. It is also advantageous to arrange the kerf cleaning finger between the two or three sets of bits on a cylindrical drum so as to provide ample opportunity to clean the cuttings from the kerf preceding each set of bits.

Another object of this invention is the provision of steps on the forward edge of the cutter element to receive the bit holders which steps progressively extend the cutting edge of consecutive bits from the leading bit, the second set of bits being mounted on steps that extend the cutting edges of their bits further forward than the first set of cutting bits.

Another object is the provision of a rotatable and advanceable cutter element in the form of an arcuate section of a cylinder and having a plurality of bit holders carrying bits on the forward end positioned to cut the center and clearance on each side to form an annular kerf. Another advantage of this type of cutter element is the provision of a wedge breaker secured to the outer surface of the arcuate sector and small enough at its forward end to enter the kerf formed by the bits and for the purpose of breaking material being cut outwardly from the arcuate section. Another advantage of this character of arcuate section of a cutter element is that it may function as a breaker and may readily be supported on a base having a driving shank for supporting it on the end of a shaft such as a shaft on an auger string. Another advantage of this character of a cutter element of an arcuate cylindrical section lies in the fact that a sliding plate may be secured to the base and to the inner arcuate wall of the arcuate section to reinforce the same and provide a wall surface to guide the material laterally outward between the gap forming the arcuate cylindrical section of the head.

Another object of this invention is the provision of a mining machine head having inner and outer coaxial and at least partly concentric rotatable and advanceable cutter elements each having bit holders with bits on their forward ends and a passage therethrough and with a base secured to said inner cutter element guiding its passage laterally in front of the base and a wedge breaker secured to the outer face of the inner cutter element just small enough to have its forward end in the kerf formed by the bits thereof and its latter end forcing the material outwardly toward the outer cutter element. Another advantage of a head of this construction is the provision of an arcuate section forming the inner cutter element in combination with a third cutter element also provided with bit holders and bits on its forward end and supported between the first and second cutter elements by a helical flight secured to the outer surface of said second cutter element leaving an open space between the third cutter element and the first cutter element and a wedge breaker on the third cutter element to function in the same manner as a wedge breaker on the second cutter element. A further advantage of this structure lies in the fact that the breaker wedge of the second cutter element lags the third cutter element and the breaker wedge carried thereby. Another advantage of a structure of this character lies in the fact that the leading edges of the second and third cutter elements may lie in the same radial plane or the leading edge of the third cutting element may be in advance of the leading edge of the second cutter element and still provide an annular gap between the leading edge of the third cutter element and the trailing edge of the second cutter element. Each of the foregoing advantages of this object may also be endowed with the advantages of the cutter bits lying with their cutting edges in the same transverse plane or with the steps in their forward end to make the progressive series of the cutter bits of each group precheck in advance further than the preceding bit and this cutting head may further be endowed with the advantages of the kerf cleaning fingers with their pockets.

Another object of this invention is the provision of a kerf cleaning finger that is somewhat wider than the cutting bit positioned to cut the center of the kerf but less than the extent of the cutting edges of each of the two bits cutting clearance on opposite sides of the center bit and with the finger projecting outwardly and forwardly but to a less extent than that of the adjacent cutting bits. Another advantage is the provision of a pocket formed in the forward edge of the cutter element and backed up by the material of the cutting finger and in line with the sweep of the forward face of the cutting finger to guide the kerf cuttings downwardly into the pocket where they will be distributed laterally by a pointed edge at the pocket to guide the cuttings laterally in either direction or in a selected lateral direction.

Other objects and advantages of this invention appear hereinafter in the following description and claims.

The accompanying drawings show for the purpose of exemplification without limiting the invention or claims thereto certain practical embodiments of this invention wherein:

Figure 1:
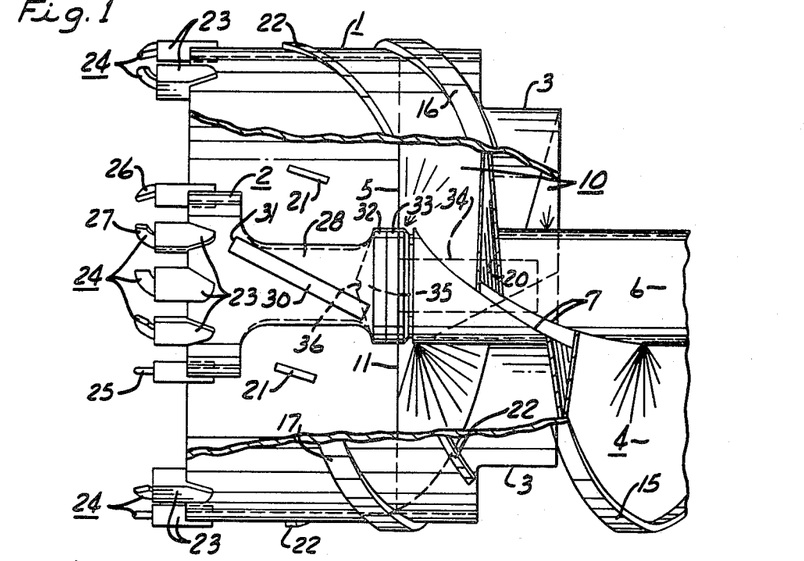
FIG. 1 is a view in vertical section of a full barrel and full breaker mining head.
Figure 2:
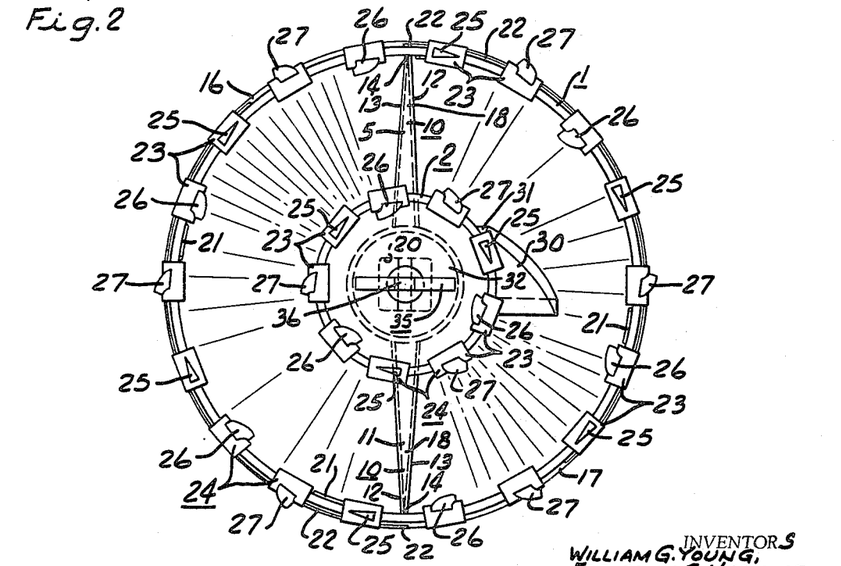
FIG. 2 is a view in front elevation of FIG. 1.

Referring to FIGS. 1 and 2 of the drawings the mining machine head consists of the outer cylindrical cutter element 1 and the inner cylindrical cutter element 2. The outer cylindrical cutter element 1 is a cylindrical barrel having opposed arcuate tailpieces 3 cut to support the helical conveyor flight section 4 as it enters the barrel 1 and which extends to the position indicated at 5. The helical conveyor flight 4 is secured to the tubular shaft 6 as indicated at 7 and the rear end of the shaft 6 is provided with a square socket 8 to receive a driving shank or pin on the next consecutive conveyor section.

A short conveyor flight 10 extends from the other arcuate tailpiece 3 forwardly within the barrel head 1 to the position indicated at 11 which is diametrically opposite to the leading edge of the conveyor 4 as indicated at 5 and as shown at 5 and 11 in FIG. 2. In view of the fact that this is a leading auger section carrying the mining machine head the auger flights 4 and 10 both long and short are made up of two auger flight sections 12 and 13 as indicated in FIG. 2 which are secured together at their perimeter as indicated at 14 to the inner surface of the auger drum 1 and to the inner surface of the wearing bar 15 extending from the rear end of the cutter element and following the helical conveyor section 4 to the end of the shaft 6.

The perimeter of the drum is provided with a matching bar 16 that mates and is spliced to the front end of the bar 15 and a corresponding wear bar 17 is secured to the outer surface of the barrel 1 opposite to the apex 14 of the short flight section 10. The A shape of flights 4 and 10 are closed at their forward ends 5 and 11 by a triangular plate 18 which preferably lies in the same surface plane on the square socket 20 in the end of the shaft 6. The inner cylindrical surface of the drum 1 is provided with the spaced bars 21 which are slanted to an angle sharper than the helix of the conveyors. Intermediate the flights represented by the wear plates 16 and 17 on the outer cylindrical surface of the drum 1 is provided a pair of small wearing rods 22. As shown in FIG. 2 the small wearing bars 22 do not extend radially as far as the wide wearing bars 16 and 17. These bars not only function as wearing plates but also to convey any finds rearwardly of the drum head 1. As shown in FIGS. 1 and 2 the bit holders 23 are bifurcated and slip over the forward end of the arcuate cylindrical sections of the outer cutter element or barrel 1 as well as the inner arcuate section of the cylindrical inner cutter element 2. Each of these cutter elements have more than one set of bit holders 23 for supporting the bits 24 as indicated in FIG. 1, the position of the centralmost bit being indicated at 25 and the bits cutting the clearance on the inner side being indicated at 26 and the bits cutting the clearance on the outer side being indicated at 27. A set of bit holders cannot be less than three as there are no intermediate positions than that shown at 25, 26 and 27 because the kerf cut is of uniform width. As shown in FIG. 2 there are three sets of bits owing to the fact that there are three bits 25, three bits 26 and three bits 27 forming the complete circle on the forward end of the cutter element 2.

The cylindrical section of the inner cutter element 2 has oppositely disposed and rearwardly extending legs 28 preferably one of which is provided with a wedge 30 having its small leading end 31 positioned just below the bit block 23 and the straight flat sides of the wedge block 30 forming an angle of approximately 30° to the plane parallel with the rotary axis of the head.

The rearward ends of the leg 28 are secured to the transverse base 32 which is circular as shown and which is backed up by a ring 33 of the same diameter which fits over the drive shank 34 that is square in cross section to fit within the socket 20. These parts are welded together and the ends of the legs 28 are made arcuate in the manner of a Phillip to strength the structure where it joins the head at one end and the base 32 at the other. An inner cutting bar 35 is secured to the forward surface of the base 32 and is provided with a cutout at the center at 36 and the edges of the forward face of the bar 35 are cut to slope in the opposite direction as indicated in FIG. 1.

Both the cutter bar 35 and the wedge member 30 are surface hardened to withstand the abrasion of mining.

Figure 5:
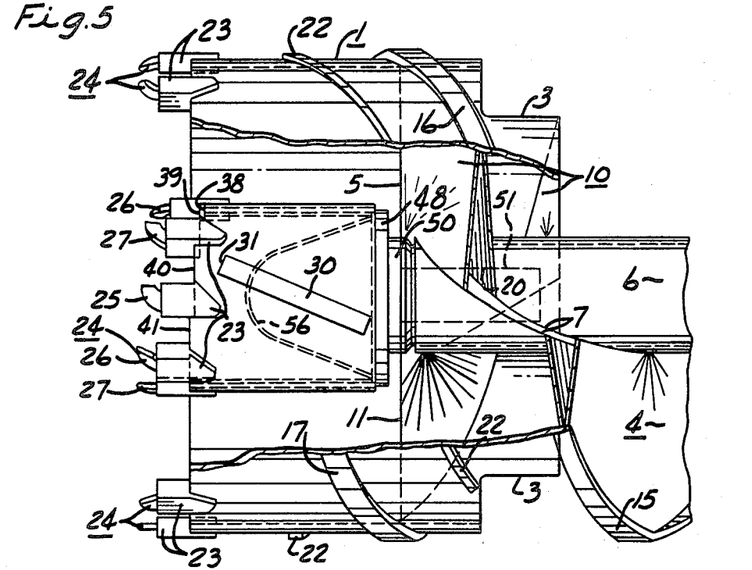
FIG. 5 is a view in vertical section of a full barrel and half breaker mining head.
Figure 6:
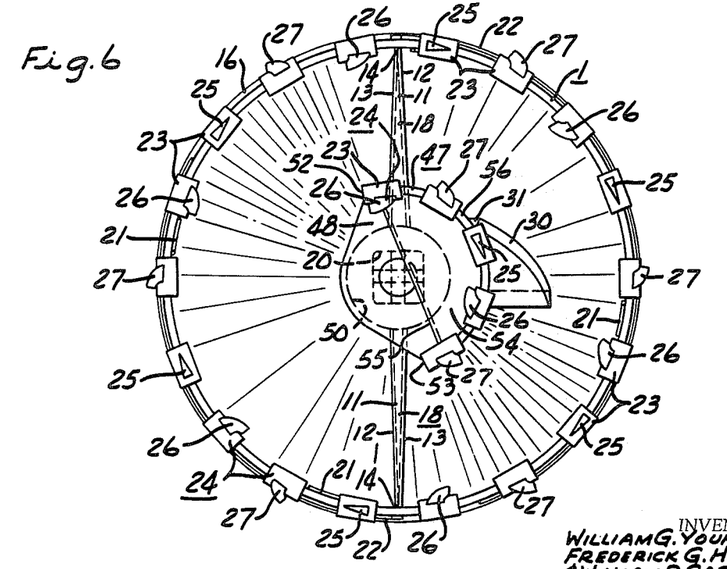
FIG. 6 is a view in front elevation of FIG. 5.
Figure 10:
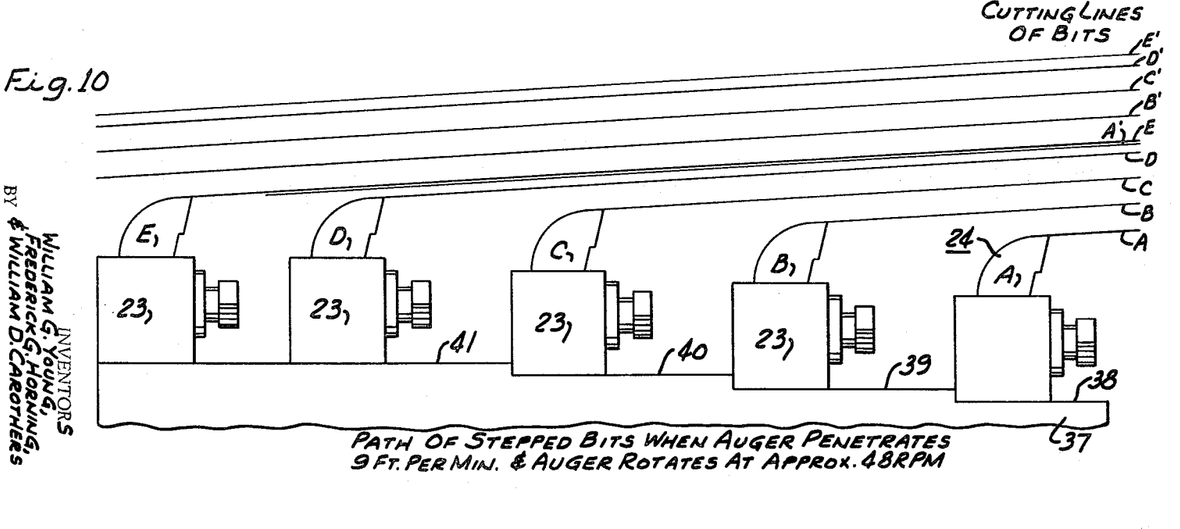
FIGS. 10 and 12 are views illustrating the penetration of stepped bits operated at 48 r.p.m. and advancing 9 feet per minute.

Referring now to FIGS. 5, 6 and 10 the inner cutter element is of arcuate section as indicated at 37 in FIG. 10 and their forward edge is stepped as indicated at 38, 39, 40 and 41, the first step or surface being indicated as the normal forward edge 38 of the cutter element, the second step being indicated at 39 and each succeeding step being progressively forward from the original cutter element edge to at least one of the last two bits of the set. If the next set of bits provides an additional series of steps being extended further than the step 41, then the last bit of the set shown in FIG. 2 would be positioned on a step extending forward to the same extent as the previous steps 40 and 39. If, however, there is only one set of bits on the cylindrical arcuate member 37 as shown in FIG. 10 then the last bit is preferably positioned at the same distance as the preceding bit. The bits in FIG. 10 would preferably be positioned as indicated in FIGS. 1 and 2, position 25 for the first bit, 26 for the second bit, position 27 for the third bit, position 25 for the fourth bit and position 27 for the fifth bit. If, of course, there are six bits in this group, it would make two complete sets of bits. When there are only five bits, it is preferable to have the last bit cut the outer or greater diameter of the kerf than the inner bit 26.

Figures 3, 4, 14, 15:
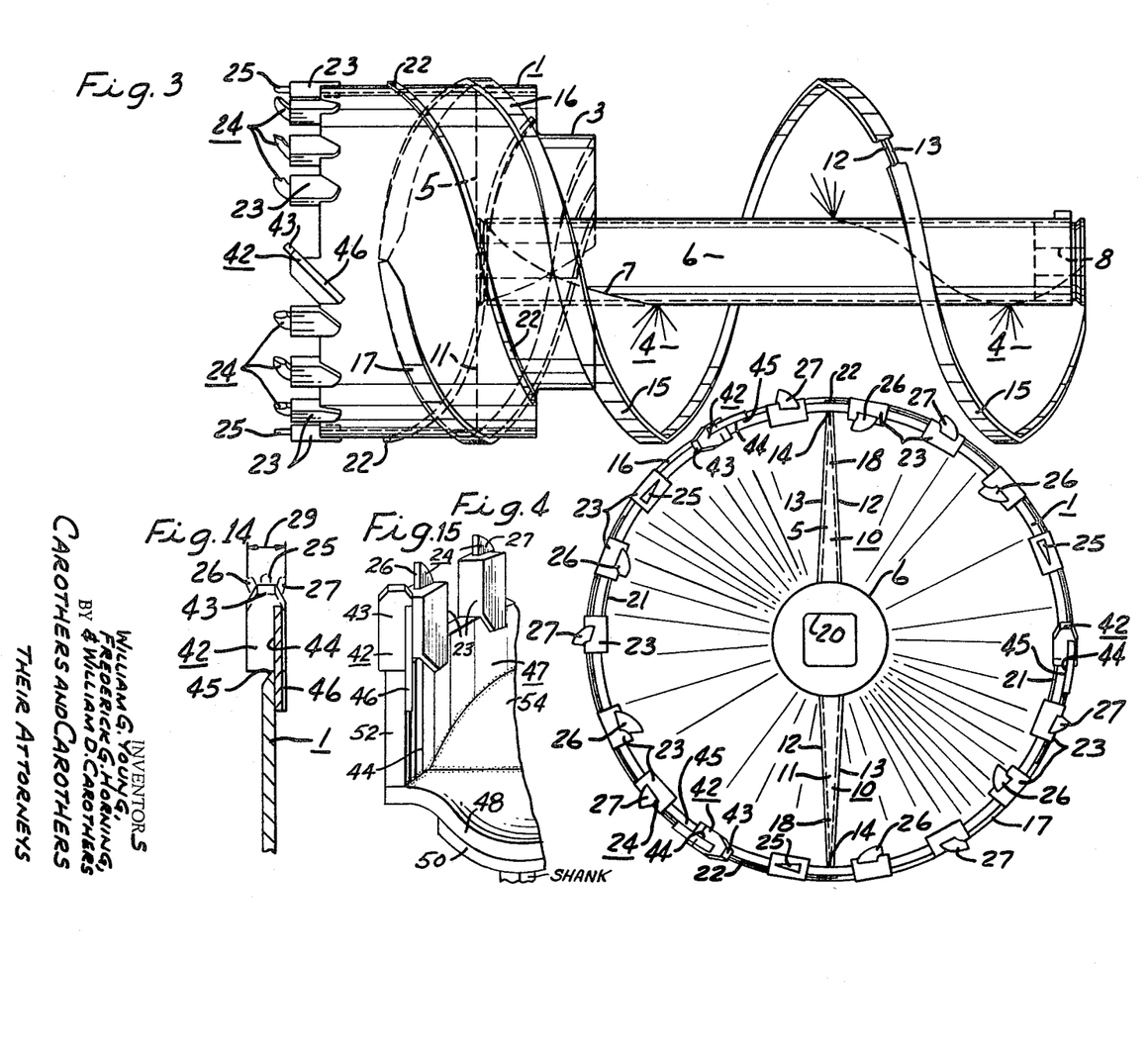
FIG. 3 is a view in vertical of a full barrel and full breaker mining head with interrupted bit sets with a kerf cleaning finger therebetween.
FIG. 4 is a view in front elevation of FIG. 3.
FIG. 14 is a vertical section in part of the outer cylindrical cutter element showing the bug dust finger.
FIG. 15 is a perspective view of the leading edge of a semi-cylindrical drum inner cutter having a kerf cleaning finger on its leading edge with parts broken away.

Since there are three bits each on the drum 1 as shown in FIGS. 3 and 4 and there is a considerable gap between the sets of three bits each, this gap is provided with a kerf cleaning or "bug dust" finger 42, the forward end 43 of which does not extend out as far as the center position bit 25 and is somewhat wider than this bit but not as wide as the clearance cut by the inner and outer positioned bits 26 and 27 as indicated in FIG. 14 by the kerf width line 29.

The finger 42 is not intended to cut any part of the kerf but merely to reach up into the kerf and cause the cuttings and finds to be drawn down into its inner arcuate surface 44 to the pocket 45 therebelow as shown in FIG. 14. The pocket 45 preferably extends through the forward edge of the barrel 1 and the barrel in turn is reinforced by the bifurcated sides 46 of the finger base and may have a pointed edge as it sweeps around in the pocket 45 to cause the cuttings drawn thereinto to flow to the inner side of the drum 1.

As shown in FIG. 4 the bits 24 have been reduced to two sets of three bits each in place of three as shown in FIG. 2 with the finger 42 positioned in the gaps between the two sets of bits. The bits 24 have been reduced in number from six sets to three sets being cut in half with a finger 42 between each set. The large gap formed by the material reduction of the bit sets in FIG. 3 is due to removal of three bit holders and corresponding bits from that shown in FIG. 2 to provide space on the forward end of the barrel 1 for the three fingers 42.

The kerf cleaning finger 42 is shown on the leading edge 52 of the semicylindrical drum 47 and its forward end 43 extends forwardly from the center position on this leading edge formed between the inner and outer arcuate walls of the semicircular drum 47. As previously stated, the kerf cleaning finger 42 is smaller in size than the kerf. It is not intended to cut any part of the kerf and is therefore spaced from the free walls defining the kerf and merely reaches into the kerf to cause the cuttings and the finds to be drawn out of the kerf. As shown in FIGURE 14 the forward end of the kerf cutting finger 42 lies below the bits 24 and particularly the lowest bit in the step series of bits shown in FIGURE 5 which is adjacent the leading edge 52 of the semi-cylindrical drum 47.

In the structure shown in FIGS. 5 and 6 the outer cutter element is shown as the barrel 1 wherein, as in FIG. 1, the bits 24 are disposed in the same transverse plane. Thus this phase of the head is the same as that previously described in regard to FIG. 1 and each of the elements are accordingly marked with the same reference numerals. However, as clearly shown in FIG. 6 the arcuate section 47 extends slightly more than 180° which represents the inner or second cutter element and is mounted on the base 48 which with the collar 50 is welded to the square driving shank 51. In this instance the base 48 is not round in the fore part. It is merely made silghtly larger than the collar 50 as shown in FIG. 6 and extends to the inner corner of the arcuate section 47 from its leading edge 52 to the inner edge of the trailing edge 53.

The center of this arcuate section has secured to the outer face the breaker wedge 30 with its leading forward edge 31 disposed so as to enter the kerf and as previously shown this wedge is disposed at 30° to a plane passing through the rotary axial center of the head. A sloping plate 54 is secured across the base 48 as indicated at 55 and is welded around the arcuate interior surface of the arcuate section 47 as indicated by the lines 56 which materially strengthens the head as well as provides a sloping baffle to redirect the material traveling through the passage of this head and laterally through the side between the leading and lagging edges 52 and 53 of this cutter element. Any material that tends to core may extend until it strikes the plate which will cause it to break laterally and be ejected through the space formed by this arcuate section of the inner cutter element. When mining coal it has been found that with this arcuate cutter section 47 coal will not core and no wear is detectable on the face of the sloping plate 54 as illustrated in the drawing. The arcuate section of the inner cutter element 47 is symmetrically disposed relative to the rotary axis so as to be in substantial alignment with the start of each of the conveyor flights 4 and 10. This structure is believed to be most efficient in boring coal.

Figure 7:
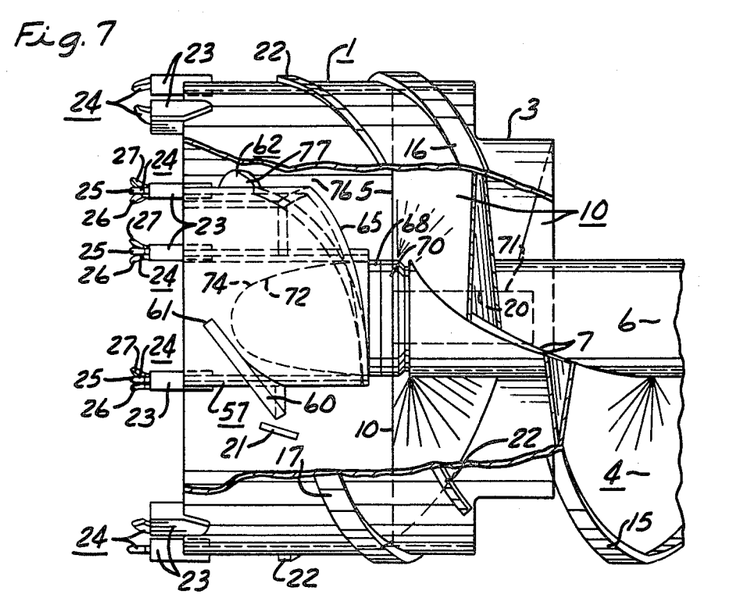
FIG. 7 is a view in vertical section of a full barrel and dual half breaker mining head.
Figure 8:
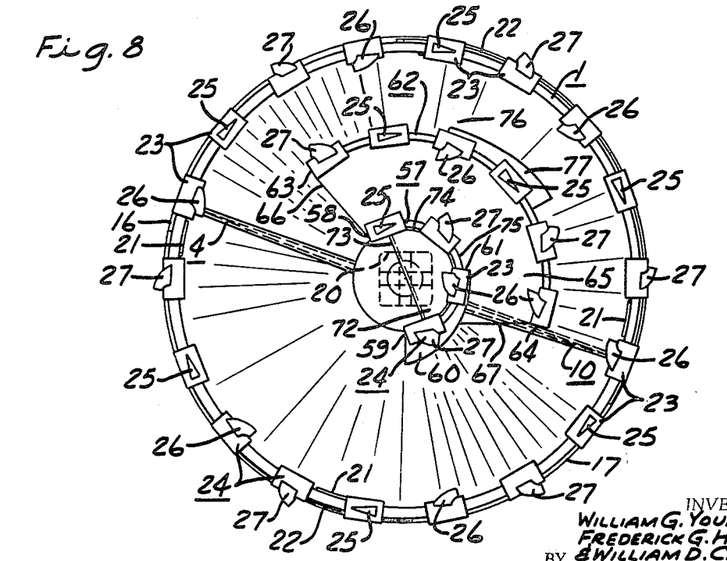
FIG. 8 is a view in front elevation of FIG. 7.

In the structures of FIGS. 7 and 8 the outer cutter element 1 is the same as that previously described. However, the inner cutter element is a modification of that shown in FIGS. 5 and 6 and is made with two arcuate sections concentric with the rotary axis. The innermost arcuate section 57 is very similar in structure to that shown in FIGS. 5 and 6 but is smaller in radius having room for only four bits 24 of which the first bit is shown as position 25, the second bit as position 27, the third bit as position 26 and the fourth and last bit as position 27. The leading edge of the arcuate section 57 is indicated at 58 and the trailing edge at 59 which is aligned with the rear end of the breaker member 60, the small end 61 of which is disposed at approximately 60° to a plane passing through the rotary axis. The reason for the different shape in the breaker 60 than that of the breaker 30 is to dispose this breaker so that it will be ineffective beyond the trailing edge of the next succeeding arcuate section in the form of the third cutter element 62 which arcuate section has its leading edge 63 substantially in radial alignment with the leading edge 58 of the cutter element 57 and the trailing edge 64 of the arcuate section 62 has its horizontal projection passing approximately through the center of the trailing edge 59 of the arcuate section 57.

The arcuate section 62 has a helical rear edge secured to the helical plate 65 which represents the bottom of the space between the arcuate section 57 and 62 and the leading edge of this arcuate plate 65 is indicated at 66 which is substantially radial in alignment with the leading edges 58 and 63 and its trailing edge 67 is substantially in alignment with the horizontal connection between the trailing edge 59 and the trailing edge 64.

The arcuate section 57 is secured to the circular base 68 which is in turn secured to the ring member 70 that is welded to the driving shank 71. A sloping plate 72 has its bottom edge 73 welded across the top of the base 68 and has its arcuate edge welded to the inner arcuate surface of the arcuate section 57 as indicated at 74. The inner edge of the plate 65 is welded in the helical line 75 along the cylindrical surface of the arcuate section 57. This structure induces a very strong intermediate cutter element that leaves a wide gap indicated at 76 between the inner surface of the barrel 1 and the outer surface of the arcuate section 62 which in this instance forms the third cutter element.

This cutter element is provided with a breaker 77 which is disposed substantially at the same angle as that of the breaker 60 and is secured to the back or outer arcuate surface of the cylindrical section 62.

The third cutter element 62 is provided with six bits 24, the first being shown in position 27, the second in position 25 and the third in position 26, the fourth in position 25, the fifth in position 27 and the sixth in position 26 as indicated. However, the spacing between the bits is not much different between that of the bits on the second and inner cutter element 57.

The square shank 71, of course, supports both the second and third cutter elements 57 and 62 in a fixed position relative to the drum 1 and also relative to the starting points of the conveyor flights 4 and 10 as indicated in FIG. 8.

Figure 9:
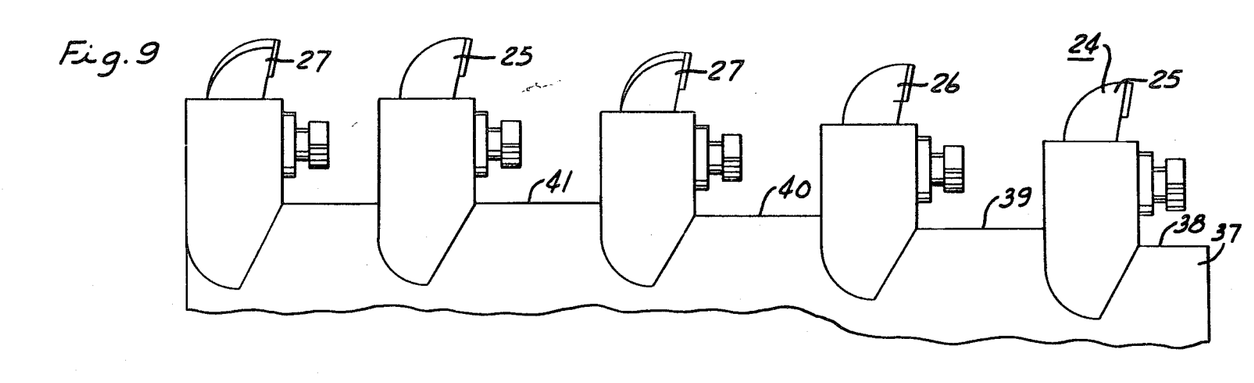
FIG. 9 is a view of bit holders mounted on progressive steps of the barrel and breakers.
Figure 11:
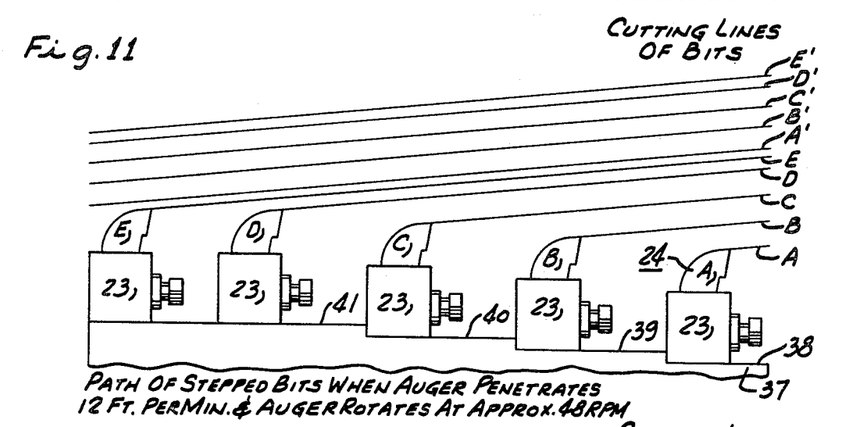
FIGS. 11 and 13 are views illustrating the penetration of stepped bits operated at 48 r.p.m. and advancing 12 feet per minute.
Figure 12:
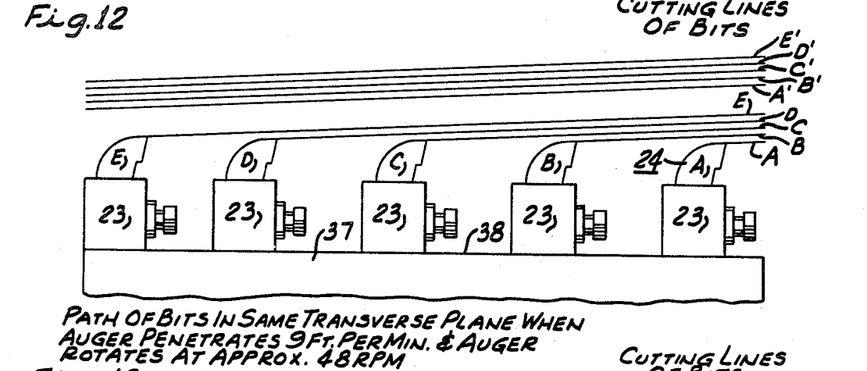
Figure 13:
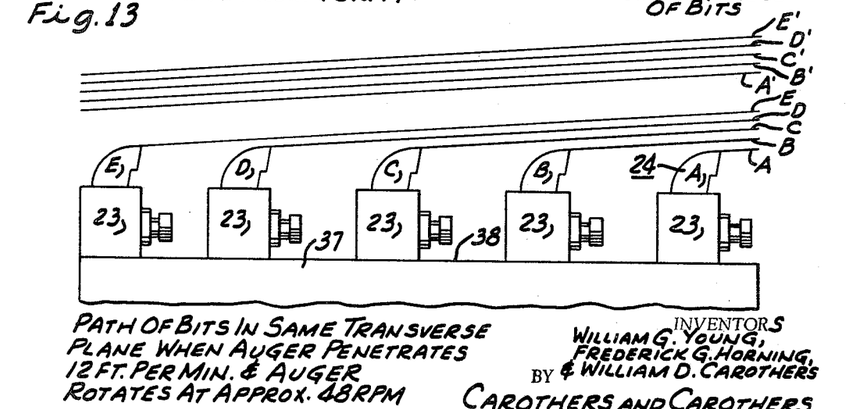

Referring now specificaly to FIGS. 9 and 10 and 11 the stepped arrangement shown in FIG. 9 appears to work ideally with a second inner cutter element such as indicated at 47 in FIG. 6 wherein the steps are measured off in equal elevations of three-eighths of an inch from the base or starting edge 38 of the arcuate section 37. The structures shown in FIGS. 10 and 11 illustrate the same disposition of bits 24 and the amount of material together with the slope at which they travel when as shown in FIG. 10, the feed of the auger requires it to penetrate at 9 feet per minute at approximately 48 revolutions per minute, whereas in FIG. 11 the same condition is shown when the feed rate of the auger requires a penetration of 12 feet per minute at the same rotary speed. This illustrates how each bit is required to function in producing the kerf and wherein a material advancement is made over that illustrated in FIGS. 12 and 13 wherein the bits are all mounted on the same elevation 38 and are caused to travel in feed at 9 feet per minute and 12 feet per minute respectively. These bits 24 are indicated as A, B, C, D and E positions wherein D and E bits cut in the same manner as all of the bits of FIG. 10 as do all the bits in FIG. 12, but bits A, B and C each take a materially greater load as indicated between the parallel lines extended in the slope of the spiral at a penetration rate of 9 feet per minute at 45 revolutions per minute.

In FIGS. 10 through 13, the cutting lines of the bits A, B, C, D and E are shown also in advancing the cutter element, A', B', C', D' and E' indicating the path the bits follow after one revolution of the cutter element. It should be noted in comparison of FIGS. 10 and 11 with FIGS. 12 and 13 that the greater the advancement of the bits in FIGS. 10 and 11 is due to the stepping of the bits and bit holders 23. Also the rate of advancement is more uniform.

We claim:

1. A rotary auger mining head having an outer cylindrical barrel cutter mounted on an auger section having a forwardly open shank socket and a demountable inner cutter each with a passage therethrough and cutting bits on their forward arcuate edges for cutting annular concentric kerfs and a breaker kerf entering wedge on the outer arcuate surface of the inner coaxial cutter, characterized by a drive shank for axial insertion in said shank socket, said inner cutter secured on the end of said drive shank concentrically with the rotary axis of said auger section, and a collar on said drive shank between said inner cutter and the end of said socket on said rotary auger section.

2. The rotary auger mining head of claim 1 characterized by a second inner coaxial cutter having cutting bits on its forward arcuate edge and mounted partially within said first inner coaxial cutter, said first and second inner cutters each including a semicircular drum with inner and outer arcuate walls having spaced leading and trailing edges each providing a substantially semicylindrical inner coaxial cutter with its lateral opening as the passage therethrough and facing in the same direction, and a breaker wedge on said second coaxial cutter extending beyond said trailing edge of said first coaxial cutter.

3. An auger cutter including a drive shank for axial insertion in the socket of a rotary auger section, a transverse base secured to one end of said shank, a substantially semicylindrical drum with inner and outer arcuate walls ending in a leading and a trailing edge and having one semicircular arcuate edge secured to said base concentrically with the rotary auger axis, a series of bit holders secured to the outer semicircular arcuate edge for receiving bits to cut an annular kerf with a clearance for said semicrcular drum.

4. The rotary auger cutter of claim 3 characterized by steps on the forward edge of said substantially semicylindrical coaxial drum to progressively position said cutter bits forwardly in an axial direction.

5. The rotary auger cutter of claim 3 characterized by a laterally disposed forwardly projecting kerf cleaning finger secured on said forward leading edge and projecting into the kerf to a less extent than said bits to remove and deflect the kerf cuttings laterally from the advancing forward arcuate cutting edge forming the kerf.

6. The auger cutter of claim 3 characterized by a reinforcing plate receded from said leading and trailing and outer arcuate edge of said drum and secured to the said base and sloping to engage said inner arcuate wall to which it is secured.

7. The auger cutter of claim 3 characterized by a kerf entering wedge secured to the outer arcuate wall surface of said semicylindrical drum, and a cylindrical barrel cutter having bit holders with bits on its forward edge and mounted on said rotary auger section coaxially encircling said inner semicylindrical cutter.

8. The auger cutter of claim 7 characterized by a collar on said drive shank between said transverse base and the end of said socket on said rotary auger section.

9. The auger cutter of claim 3 characterized by a second semicylindrical drum with inner and outer arcuate walls ending in a leading and a trailing edge and a helical arcuate base secured to one arcuate edge of said second semicylindrical drum and to the outer wall of said first semicylindrical drum concentric with the auger rotary axis, a series of bit holders secured to the outer semicircular edge of said second semicylindrical drum, bits in said holders to cut an annular kerf with a clearance for said second semicylindrical drum.

10. The auger cutter of claim 9 characterized by a second kerf entering wedge on the outer arcuate surface of said second semicylindrical drum, and a cylindrical barrel cutter having bit holders with bits on its forward edge and mounted on said rotary auger section coaxially encircling said first and second semicylindrical drum cutters.

11. The auger cutter of claim 10 characterized by a collar on said shank between said transverse base and the end of said socket on said rotary auger section.

12. A rotary auger mining head having an outer cylindrical barrel cutter and an inner coaxial cutter with bits on the arcuate forward edges of each cutter for cutting annular concentric kerfs, characterized by a laterally disposed forwardly projecting kerf cleaning finger on the arcuate forward edge of at least one of said cutter edges and projecting to a less extent than said bits to remove and deflect the kerf cuttings laterally from the advancing arcuate forward edges of the cutter.

13. The rotary auger mining head of claim 12 characterized by a plurality of said kerf cleaning fingers disposed in spaced relation around the forward cutting edge of said cylindrical barrel.

14. The rotary auger mining head of claim 12 characterized by a reinforcing plate extending down one side of said kerf cleaning finger to direct the cuttings inwardly of said advancing arcuate forward edge.

15. The rotary auger mining head of claim 12 characterized by a tilt in said forwardly projecting kerf cleaning finger forming a recess in the direction of the arcuate motion of cutting.

References Cited

UNITED STATES PATENTS

| | | | |
|---|---|---|---|
| 2,594,256 | 4/1952 | Compton | 299—87 |
| 3,288,533 | 11/1966 | Gonski | 299—57 |
| 1,998,876 | 4/1935 | Lawson | 299—83 |
| 2,749,102 | 6/1956 | Goodrich | 299—87 X |
| 2,784,955 | 3/1957 | Compton | 299—87 |
| 2,899,187 | 9/1959 | Biedess | 299—90 |
| 2,955,810 | 10/1960 | McWhorter et al. | 299—90 |

FOREIGN PATENTS

| | | |
|---|---|---|
| 135,179 | 3/1921 | Great Britain. |

ERNEST R. PURSER, *Primary Examiner.*